(12) United States Patent
Seidel et al.

(10) Patent No.: US 11,812,286 B2
(45) Date of Patent: Nov. 7, 2023

(54) RADIO ACCESS NETWORK CONTROLLER-BASED MOBILITY OPTIMIZATION

(71) Applicant: Nokia Solutions and Networks Oy, Espoo (FI)

(72) Inventors: Eiko Seidel, Sauerlach (DE); Gabor Hannak, Budapest (HU); Christiane Maria Allwang, Munich (DE); Ingo Viering, Munich (DE); Ahmad Awada, Munich (DE); Alistair Urie, Issy les Moulineaux (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/119,004

(22) Filed: Mar. 8, 2023

(65) Prior Publication Data

US 2023/0292151 A1 Sep. 14, 2023

(30) Foreign Application Priority Data

Mar. 11, 2022 (FI) ...................................... 20225216

(51) Int. Cl.
*H04W 24/10* (2009.01)
*H04W 24/02* (2009.01)
*H04W 8/02* (2009.01)

(52) U.S. Cl.
CPC ............. *H04W 24/02* (2013.01); *H04W 8/02* (2013.01); *H04W 24/10* (2013.01)

(58) Field of Classification Search
CPC ........ H04W 24/02; H04W 8/02; H04W 24/10
See application file for complete search history.

(56) References Cited

U.S. PATENT DOCUMENTS

2017/0171788 A1 6/2017 Won et al. .......................... 36/8
2022/0201582 A1* 6/2022 Eklöf .............. H04W 36/00837
(Continued)

FOREIGN PATENT DOCUMENTS

EP 3962171 A1 3/2022
WO WO 2017/195078 A1 11/2017
(Continued)

OTHER PUBLICATIONS

Xiaomi et al., "RRM mobility in AI/ML for NR air interface," 3GPP TSG-RAN WG Meeting #94, RP-213239, Dec. 6-17, 2021.
(Continued)

*Primary Examiner* — Chuong A Ngo
(74) *Attorney, Agent, or Firm* — Joseph C. Drish; Harrington & Smith

(57) ABSTRACT

Radio access network controller-based mobility optimization is disclosed. Mobility reports are received at a radio access network controller from multiple network node devices, each mobility report reporting at least one individual failure event to complement one or more aggregated mobility event counters and/or one or more aggregated performance measurement reports. The mobility reports are related to client devices in one or more service areas. The radio access network controller analyzes the received mobility reports. In response to the analyzing resulting in a perceived need for an update of a cell configuration of a service area of the one or more service areas, the radio access network controller determines updated cell configuration information for the service area. The updated cell configuration information is transmitted from the radio access network controller to-wards at least one network node device in the service area.

21 Claims, 11 Drawing Sheets

(56) References Cited

U.S. PATENT DOCUMENTS

2023/0026279 A1* 1/2023 Kumar .................. H04W 24/02
2023/0055590 A1* 2/2023 Sivaraj .............. H04W 28/0236

FOREIGN PATENT DOCUMENTS

WO    WO 2018/156696 A1    8/2018
WO    WO-2020/242987 A1    12/2020

OTHER PUBLICATIONS

Qualcomm Incorporated, "Reduction of UE power consumption in RRM measurement," 3GPP TSG-RAN WG3 #114-bis-e, R3-220267, Jan. 17-26, 2022.

* cited by examiner

RADIO ACCESS NETWORK CONTROLLER-BASED MOBILITY OPTIMIZATION

TECHNICAL FIELD

The disclosure relates generally to communications and, more particularly but not exclusively, to radio access network controller-based mobility optimization.

BACKGROUND

At least some self-optimizing networks (SON) may include an algorithm called mobility robustness optimization (MRO). The MRO algorithm automatically adjusts handover mobility parameters based on mobility statistics. For example, in radio resource control (RRC) connected mode it may reduce the number of unnecessary handovers, handover failures, ping-pong failures, and call drops. Non-suitable neighbor cells may be identified and avoided, and handover measurement and decision thresholds may be adjusted.

Currently, the MRO is commonly implemented as a centralized SON function. However, at least in some situations a fully centralized MRO is a slow algorithm (e.g., optimization is performed once a day). It relies on mobility statistics which are collected and aggregated over a longer period of time (e.g., once an hour), and then reported. The reporting cycle of today's MRO related performance measurement (PM)/key performance indicator (KPI) counters are 1440 minutes (min), 720 min, 360 min, 60 min, and down to 15 minutes. Usually, this reporting cycle is the same for all the cells in a network. Scenarios have been identified in which reliable statistics could be obtained much faster and fast adaptation would bring significant benefits. An example of such a scenario is traffic on an urban highway. Cars usually move within 50 90 km/h, but during daily rush hours in the morning and afternoon or during traffic jams slower speeds are typically experienced. These scenarios provide sufficient mobility events (because lots of cars are moving on the street) in a short period of time and a faster adaptation of the mobility settings according to traffic conditions can reduce failures. The current PM/KPI counter-based approach, where statistics are aggregated, prevents the use of fast loops due to the aggregation and the added reporting delay, and does not provide information about failure patterns (e.g., the start of a traffic jam). For this reason, MRO mobility optimizations for optimized settings for, e.g., a 1 to 2-hour traffic jams are not possible with current mobile networks.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a radio access network controller comprises at least one processor, and at least one memory including computer program code. The at least one memory and the computer program code are configured to, with the at least one processor, cause the radio access network controller at least to perform receiving, from multiple network node devices, mobility reports related to client devices in one or more service areas of the multiple network node devices. Each mobility report reports at least one individual failure event to complement at least one of: one or more aggregated mobility event counters or one or more aggregated performance measurement reports. The at least one memory and the computer program code are further configured to, with the at least one processor, cause the radio access network controller at least to perform analyzing the received mobility reports. In response to the analyzing resulting in a perceived need for an update of a cell configuration of a service area of the one or more service areas, the at least one memory and the computer program code are further configured to, with the at least one processor, cause the radio access network controller at least to perform determining updated cell configuration information for the service area of the one or more service areas. The at least one memory and the computer program code are further configured to, with the at least one processor, cause the radio access network controller at least to perform transmitting the updated cell configuration information towards at least one network node device in the service area of the one or more service areas.

In an example embodiment, alternatively or in addition to the above-described example embodiments, the analyzing of the received mobility reports comprises applying a machine learning model to the received mobility reports to identify changes in mobility characteristics in the one or more service areas.

In an example embodiment, alternatively or in addition to the above-described example embodiments, the determining of the updated cell configuration information comprises applying mobility robustness optimization or beam-based mobility robustness optimization based at least on the received mobility reports.

In an example embodiment, alternatively or in addition to the above-described example embodiments, the received mobility reports comprise information about an individual failure event with an indicated root cause, or information about an individual failure event with associated assistance information to allow the radio access network controller to derive a root cause.

In an example embodiment, alternatively or in addition to the above-described example embodiments, the received mobility reports further comprise at least one of: a number of too early handovers, a number of too late handovers, a number of handovers to wrong cell, a number of ping-pong handovers, a number of requested legacy handover executions, a number of successful handover executions, or a number of failed handover executions.

In an example embodiment, alternatively or in addition to the above-described example embodiments, a failure event comprises at least one of a too late handover-failure, a too early handover-failure, a handover to wrong cell failure, or a ping-pong handover.

In an example embodiment, alternatively or in addition to the above-described example embodiments, the changes in the mobility characteristics comprise at least one of a vehicle traffic jam, a pedestrian rush hour, or a change in a cell in terms of a number of client devices, types of client devices, or groups of client devices.

In an example embodiment, alternatively or in addition to the above-described example embodiments, the updated cell configuration information comprises at least one of an updated cell individual offset, an updated beam-based cell individual offset, an updated reporting period for sending the mobility reports, an updated reporting option for sending the mobility reports, or an updated cell or beam specific configuration of the at least one network node device in the service area of the one or more service areas.

In an example embodiment, alternatively or in addition to the above-described example embodiments, the updated cell configuration information is indicated to be applied on a client device specific basis, a client device type specific basis, or a client device group specific basis.

In an example embodiment, alternatively or in addition to the above-described example embodiments, the receiving of the mobility reports is performed on a client device specific basis, a client device type specific basis, or a client device group specific basis.

In an example embodiment, alternatively or in addition to the above-described example embodiments, at least one of the receiving of the mobility reports or the transmitting of the updated cell configuration information is performed via using at least one of an E2 interface or an E2 service model protocol.

In an example embodiment, alternatively or in addition to the above-described example embodiments, the radio access network controller comprises a near-real time radio access network controller.

An example embodiment of a radio access network controller comprises means for performing causing receiving, from multiple network node devices, of mobility reports related to client devices in one or more service areas of the multiple network node devices. Each mobility report reports at least one individual failure event to complement at least one of: one or more aggregated mobility event counters or one or more aggregated performance measurement reports. The means are further configured to perform analyzing the received mobility reports. In response to the analyzing resulting in a perceived need for an update of a cell configuration of a service area of the one or more service areas, the means are further configured to perform determining updated cell configuration information for the service area of the one or more service areas. The means are further configured to perform causing transmitting of the updated cell configuration information towards at least one network node device in the service area of the one or more service areas.

In an example embodiment, alternatively or in addition to the above-described example embodiments, the analyzing of the received mobility reports comprises applying a machine learning model to the received mobility reports to identify changes in mobility characteristics in the one or more service areas.

In an example embodiment, alternatively or in addition to the above-described example embodiments, the determining of the updated cell configuration information comprises applying mobility robustness optimization or beam-based mobility robustness optimization based at least on the received mobility reports.

In an example embodiment, alternatively or in addition to the above-described example embodiments, the received mobility reports comprise information about an individual failure event with an indicated root cause, or information about an individual failure event with associated assistance information to allow the radio access network controller to derive a root cause.

In an example embodiment, alternatively or in addition to the above-described example embodiments, the received mobility reports further comprise at least one of: a number of too early handovers, a number of too late handovers, a number of handovers to wrong cell, a number of ping-pong handovers, a number of requested legacy handover executions, a number of successful handover executions, or a number of failed handover executions.

In an example embodiment, alternatively or in addition to the above-described example embodiments, a failure event comprises at least one of a too late handover-failure, a too early handover-failure, a handover to wrong cell failure, or a ping-pong handover.

In an example embodiment, alternatively or in addition to the above-described example embodiments, the changes in the mobility characteristics comprise at least one of a vehicle traffic jam, a pedestrian rush hour, or a change in a cell in terms of a number of client devices, types of client devices, or groups of client devices.

In an example embodiment, alternatively or in addition to the above-described example embodiments, the updated cell configuration information comprises at least one of an updated cell individual offset, an updated beam-based cell individual offset, an updated reporting period for sending the mobility reports, an updated reporting option for sending the mobility reports, or an updated cell or beam specific configuration of the at least one network node device in the service area of the one or more service areas.

In an example embodiment, alternatively or in addition to the above-described example embodiments, the updated cell configuration information is indicated to be applied on a client device specific basis, a client device type specific basis, or a client device group specific basis.

In an example embodiment, alternatively or in addition to the above-described example embodiments, the receiving of the mobility reports is performed on a client device specific basis, a client device type specific basis, or a client device group specific basis.

In an example embodiment, alternatively or in addition to the above-described example embodiments, at least one of the receiving of the mobility reports or the transmitting of the updated cell configuration information is performed via using at least one of an E2 interface or an E2 service model protocol.

In an example embodiment, alternatively or in addition to the above-described example embodiments, the radio access network controller comprises a near-real time radio access network controller.

An example embodiment of a method comprises receiving, at a radio access network controller from multiple network node devices, mobility reports related to client devices in one or more service areas of the multiple network node devices. Each mobility report reports at least one individual failure event to complement at least one of: one or more aggregated mobility event counters or one or more aggregated performance measurement reports. The method further comprises analyzing, by the radio access network controller, the received mobility reports. The method further comprises in response to the analyzing resulting in a perceived need for an update of a cell configuration of a service area of the one or more service areas, determining, by the radio access network controller, updated cell configuration information for the service area of the one or more service areas. The method further comprises transmitting the updated cell configuration information from the radio access network controller towards at least one network node device in the service area of the one or more service areas.

In an example embodiment, alternatively or in addition to the above-described example embodiments, the analyzing of the received mobility reports comprises applying a machine learning model to the received mobility reports to identify changes in mobility characteristics in the one or more service areas.

In an example embodiment, alternatively or in addition to the above-described example embodiments, the determining of the updated cell configuration information comprises applying mobility robustness optimization or beam-based mobility robustness optimization based at least on the received mobility reports.

In an example embodiment, alternatively or in addition to the above-described example embodiments, the received mobility reports comprise information about an individual failure event with an indicated root cause, or information about an individual failure event with associated assistance information to allow the radio access network controller to derive a root cause.

In an example embodiment, alternatively or in addition to the above-described example embodiments, the received mobility reports further comprise at least one of: a number of too early handovers, a number of too late handovers, a number of handovers to wrong cell, a number of ping-pong handovers, a number of requested legacy handover executions, a number of successful handover executions, or a number of failed handover executions.

In an example embodiment, alternatively or in addition to the above-described example embodiments, a failure event comprises at least one of a too late handover-failure, a too early handover-failure, a handover to wrong cell failure, or a ping-pong handover.

In an example embodiment, alternatively or in addition to the above-described example embodiments, the changes in the mobility characteristics comprise at least one of a vehicle traffic jam, a pedestrian rush hour, or a change in a cell in terms of a number of client devices, types of client devices, or groups of client devices.

In an example embodiment, alternatively or in addition to the above-described example embodiments, the updated cell configuration information comprises at least one of an updated cell individual offset, an updated beam-based cell individual offset, an updated reporting period for sending the mobility reports, an updated reporting option for sending the mobility reports, or an updated cell or beam specific configuration of the at least one network node device in the service area of the one or more service areas.

In an example embodiment, alternatively or in addition to the above-described example embodiments, the updated cell configuration information is indicated to be applied on a client device specific basis, a client device type specific basis, or a client device group specific basis.

In an example embodiment, alternatively or in addition to the above-described example embodiments, the receiving of the mobility reports is performed on a client device specific basis, a client device type specific basis, or a client device group specific basis.

In an example embodiment, alternatively or in addition to the above-described example embodiments, at least one of the receiving of the mobility reports or the transmitting of the updated cell configuration information is performed via using at least one of an E2 interface or an E2 service model protocol.

In an example embodiment, alternatively or in addition to the above-described example embodiments, the radio access network controller comprises a near-real time radio access network controller.

An example embodiment of a computer program comprises instructions for causing a radio access network controller to perform at least the following: receiving, from multiple network node devices, mobility reports related to client devices in one or more service areas of the multiple network node devices, each mobility report reporting at least one individual failure event to complement at least one of: one or more aggregated mobility event counters or one or more aggregated performance measurement reports; analyzing the received mobility reports; in response to the analyzing resulting in a perceived need for an update of a cell configuration of a service area of the one or more service areas, determining updated cell configuration information for the service area of the one or more service areas; and transmitting the updated cell configuration information towards at least one network node device in the service area of the one or more service areas.

An example embodiment of a network node device comprises at least one processor, and at least one memory including computer program code. The at least one memory and the computer program code are configured to, with the at least one processor, cause the network node device at least to perform receiving information about an individual failure event related to one or more client devices while in a service area of the network node device. The at least one memory and the computer program code are further configured to, with the at least one processor, cause the network node device at least to perform generating a mobility report based on the received information. The mobility report reports the individual failure event to complement at least one of: one or more aggregated mobility event counters or one or more aggregated performance measurement reports. The at least one memory and the computer program code are further configured to, with the at least one processor, cause the network node device at least to perform transmitting the generated mobility report towards a radio access network controller.

In an example embodiment, alternatively or in addition to the above-described example embodiments, the generating of the mobility report is performed in response to at least one of: identifying a root cause for the individual failure event, or a mobility related criterion being fulfilled.

An example embodiment of a network node device comprises means for performing causing receiving of information about an individual failure event related to one or more client devices while in a service area of the network node device. The means are further configured to perform generating a mobility report based on the received information. The mobility report reports the individual failure event to complement at least one of: one or more aggregated mobility event counters or one or more aggregated performance measurement reports. The means are further configured to perform causing transmitting of the generated mobility report towards a radio access network controller.

In an example embodiment, alternatively or in addition to the above-described example embodiments, the means are further configured to perform the generating of the mobility report in response to at least one of: identifying a root cause for the individual failure event, or a mobility related criterion being fulfilled.

An example embodiment of a method comprises receiving, at a network node device, information about an individual failure event related to one or more client devices while in a service area of the network node device. The method further comprises generating, by the network node device, a mobility report based on the received information. The mobility report reports the individual failure event to complement at least one of: one or more aggregated mobility event counters or one or more aggregated performance measurement reports. The method further comprises transmitting the generated mobility report from the network node device towards a radio access network controller.

In an example embodiment, alternatively or in addition to the above-described example embodiments, the generating of the mobility report is performed in response to at least one of: identifying a root cause for the individual failure event, or a mobility related criterion being fulfilled.

An example embodiment of a computer program comprises instructions for causing a network node device to perform at least the following: receiving information about an individual failure event related to one or more client devices while in a service area of the network node device; generating a mobility report based on the received information, the mobility report reporting the individual failure event to complement at least one of: one or more aggregated mobility event counters or one or more aggregated performance measurement reports; and transmitting the generated mobility report towards a radio access network controller.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
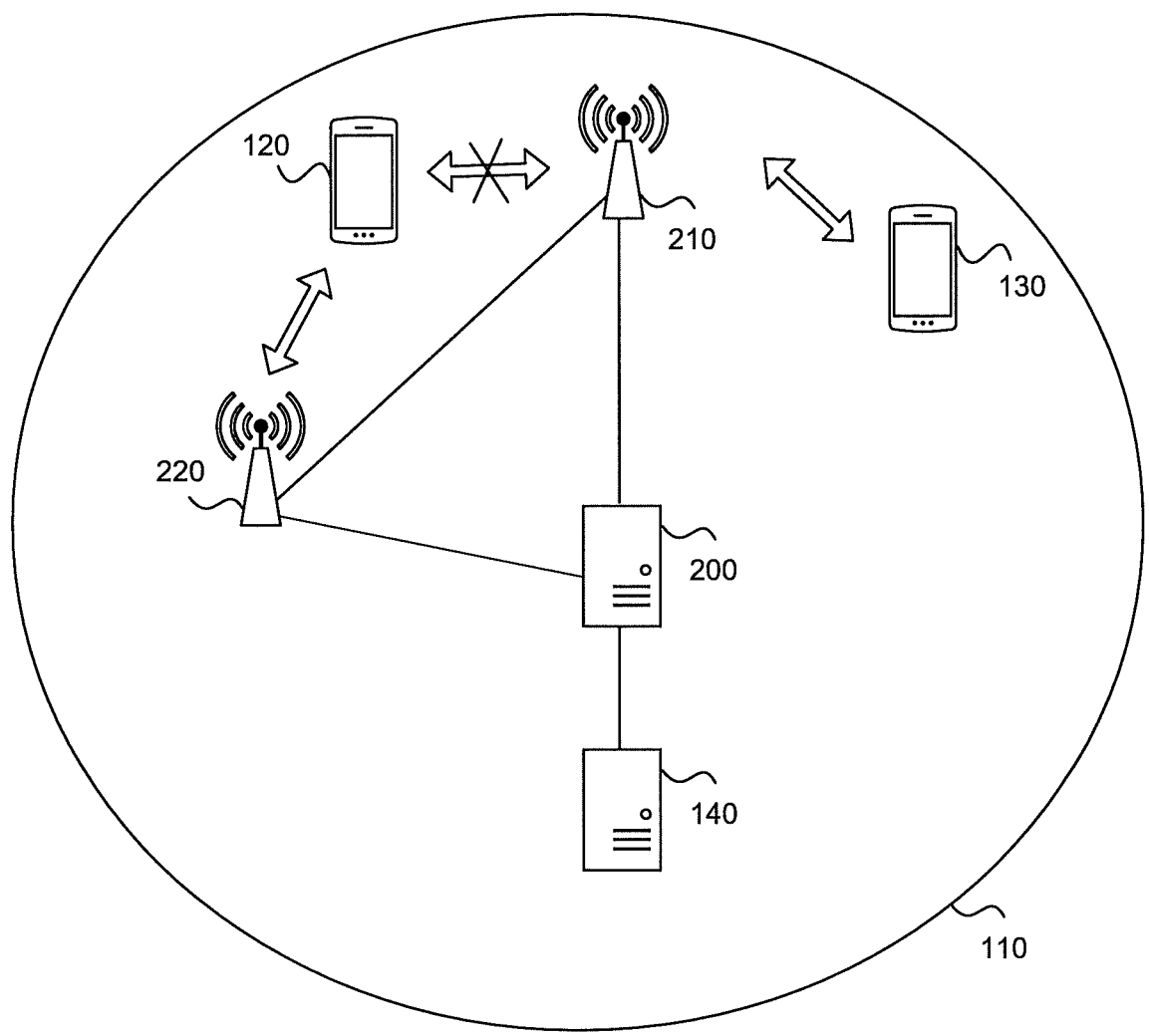
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a fifth generation (5G) new radio (NR) network 110 that may include one or more radio access networks, such as one or more open radio access networks (O-RANs). An example representation of the system 100 is shown depicting client devices 120, 130 and network node devices 210, 220. At least in some embodiments, the 5G NR network 110 may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network(s), ultra-reliable low-latency communication (URLLC) network(s), and/or the like. In other words, the 5G NR network 110 may be configured to serve diverse service types and/or use cases, and it may logically be seen as comprising one or more networks.

The system 100 may further comprise a radio access network controller 200 described in more detail below, and an operations, administration and management (OAM) entity, such as a service management and orchestration (SMO) entity 140.

At least some of the disclosed embodiments may be implemented in an O-RAN architecture. The O-RAN aims for interoperability and standardization of RAN elements including a unified interconnection standard for network functions from different vendors.

The O-RAN architecture provides a foundation for building a virtualized RAN on open hardware with an embedded artificial intelligence (AI)-powered radio control.

Function blocks of the O-RAN may comprise, e.g., an orchestration/network management system layer with a non-real time RAN intelligent controller (non-RT RIC), a near-real time RAN intelligent controller (nRT RIC) application layer, multi-radio access technology (RAT) central unit (CU) protocol stack functions, a distributed unit (DU), and a remote radio unit (RU) function blocks connected through an open fronthaul connection.

In the O-RAN architecture, the non-real time RIC may operate on a time scale of >>1 second, and handle high level/orchestration functions, and provide AI-enabled policies to machine learning (ML)-based models over an A1 interface to the near-real time RIC. The near-real time RIC may operate on a time scale of <1 second, and execute these policies and models to change the operational behavior (e.g., radio resource management (RRM)/self-organizing networks (SON)) of the network, for example.

The client devices 120, 130 may include, e.g., a mobile phone, a smartphone, a tablet computer, a smart watch, or any hand-held, portable and/or wearable device. The client device 120, 130 may also be referred to as a user equipment (UE). The network node devices 210, 220 may comprise a base station. The base station may include, e.g., a fifth-generation base station (gNB) or any such device suitable for providing an air interface for client devices to connect to a wireless network via wireless transmissions.

In the following, various example embodiments will be discussed. At least some of these example embodiments may allow radio access network controller-based mobility optimization.

Figure 3A:
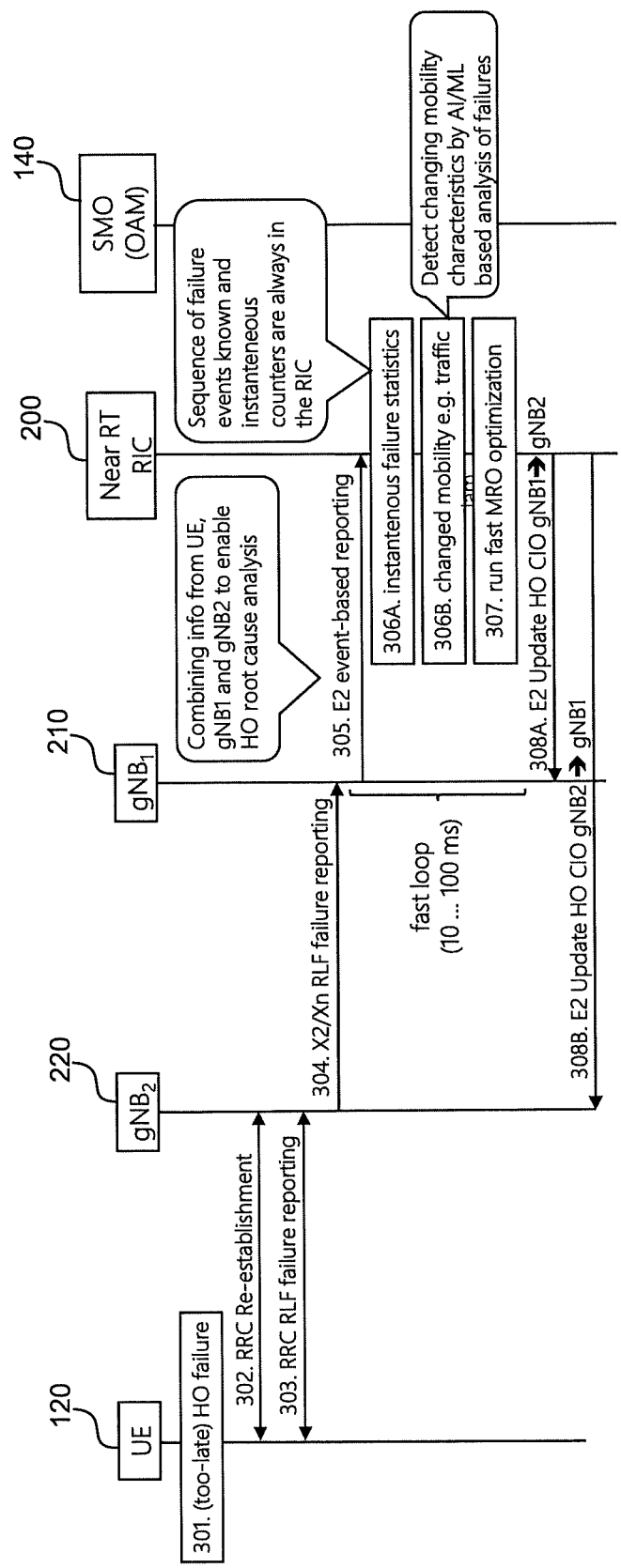
FIG. 3A shows an example embodiment of the subject matter described herein illustrating fast (beam-based) mobility robustness optimization-based mobility optimization in a near-real time radio access network controller with event-based reporting via an E2 interface.

At least some of the disclosed embodiments may allow fast mobility optimization loops (e.g., in a range of milliseconds (ms) instead of minutes or hours). The disclosed (b)MRO mobility optimization may be hosted in a near-real time radio access network controller, as illustrated in diagram 300A of FIG. 3A.

Diagram 300A represents a scenario of a too late HO failure, in accordance with an example embodiment. After a radio link failure 301 with a target network node device 210, the client device may make an RRC re-establishment to a network node device 220 at operation 302, and it may offer an RRC radio link failure report at operation 303. The network node device 220 may fetch the failure report and forward this to the network node device 210 at operation 304, which may update its PM/KPM failure statistics.

In a system with highly optimized settings, failure rates of $10^{-2}$ or $10^{-3}$ are common and essential for the user experience. In this case, every single failure may have a significant impact on statistics. Therefore, such an event may be used to initiate reporting of updated statistics from a network node device via an E2 interface immediately. An event-based and intelligent failure reporting is disclosed that not just forwards all the failure events (e.g., radio link failure (RLF) reports) to a radio access network controller at operation 304, but intelligently selects and combines signaling messages enriched with assistance information allowing a proper root failure analysis based on a single message from the network node device to the radio access network controller at operation 305. All the network node devices (network node device 220 in this case) will not send every failure indication on their own but at least some network node devices (network node device 210 in this case) may send such an event-based report at operation 305 if the information for a root cause analysis is provided in that message.

Also, the occurrence in time and the order of failures may provide significant information about a change of mobility characteristics. Based on instantaneous statistics at operation 306A and data analytics (e.g., artificial intelligence (AI)/machine learning (ML) based analytics) running in the radio access network controller 200, a change of mobility characteristics in a cell may be detected rapidly (e.g., a traffic jam may be detected based on reduced number of handover (HO) events parallel to an increase of too early HO failures since client devices started to move slower) at operation 306B. A sudden increase of failure rates, even if temporary, may result in a significant degradation of mobility performance and should be mitigated.

Such an event, once detected by the disclosed embodiments at operation 306B, may trigger a fast update of configuration parameters (e.g., (beam-based) cell individual offsets (CIOs) for mobility) at operations 307, 308A, 308B. The disclosed advanced and faster adaptation may thus take network node device events/failures into account instantaneously instead of waiting for long-term statistics to become available. Fast event-based reporting by the network node devices may be enabled adaptively on a per cell basis based on performance monitoring and may thus complement or replace existing PM/KPI counters running in the network node devices today. A reporting period T_KPI (for sending mobility reports) may also be adjusted adaptively based on failure events or statistics. Some deployment scenarios may benefit from much faster reporting periods. Faster decisions may achieve significant benefits, at least in specific areas at specific times. While current measurement configuration/reporting is on a per cell-basis only, at least some of the disclosed embodiments may also support configuration on a per client device-basis, on a per client device group-basis, or on a per slice-basis. At least some of the disclosed embodiments may allow exploiting respective gains, while keeping network node device complexity and signalling overhead at a minimum, and at least some of the disclosed embodiments may inherently co-exist with legacy slow mobility reporting and optimization mechanisms.

In other words, at least some of the disclosed embodiments may allow the radio access network controller 200 doing both short- and long-term statistics, based on the mobility reports. At least in some of the disclosed embodiments the radio access network controller 200 may build at least some of the statistics, e.g., by aggregating individual failure events. For example, the short-term statistics may control a fast inner loop, and the long-term statistics may control a slow outer loop.

Figure 2A:
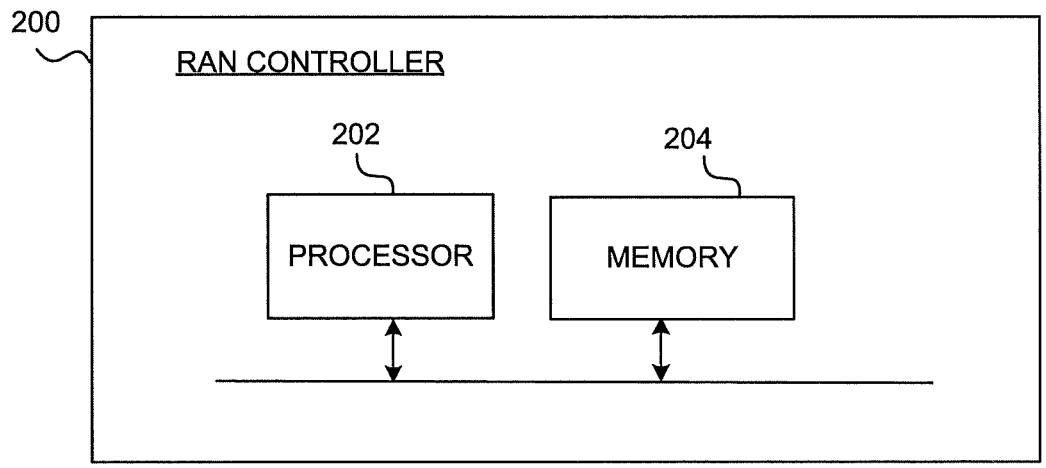
FIG. 2A shows an example embodiment of the subject matter described herein illustrating a radio access network controller.

FIG. 2A is a block diagram of the radio access network controller 200 for a radio access network, in accordance with an example embodiment. For example, the radio access network may comprise an open radio access network. For example, the radio access network controller 200 may comprise a near-real time radio access network controller.

The radio access network controller 200 comprises at least one processor 202 and at least one memory 204 including computer program code. The radio access network controller 200 may also include other elements not shown in FIG. 2A.

Although the radio access network controller 200 is depicted to include only one processor 202, the radio access network controller 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and nonvolatile memory devices. For example, the memory 204 may be embodied as semiconductor memories (such as mask ROM, PROM (programmable ROM), EPROM (erasable PROM), flash ROM, RAM (random access memory), etc.).

The at least one memory 204 and the computer program code are configured to, with the at least one processor 202, cause the radio access network controller 200 at least to perform receiving from multiple network node devices 210, 220 mobility reports related to client devices 120, 130 that are located in one or more service areas of the multiple network node devices 210, 220. Each mobility report reports at least one individual failure event to complement one or more aggregated mobility event counters and/or one or more aggregated performance measurement reports.

For example, a failure event may comprise a too late handover-failure, a too early handover-failure, a handover to wrong cell-failure, and/or a ping-pong handover.

For example, the received mobility reports may comprise information about an individual failure event with an indicated root cause, or information about an individual failure event with associated assistance information to allow the radio access network controller 200 to derive a root cause. At least in some embodiments, the received mobility reports may further comprise a number of too early handovers, a number of too late handovers, a number of handovers to wrong cell, a number of ping-pong handovers, a number of requested legacy handover executions or handover attempts (e.g., to a given neighbor cell), a number of successful handover executions (e.g., to a given neighbor cell), and/or a number of failed handover executions (e.g., to a given neighbor cell). At least in some embodiments, the receiving of the mobility reports may be performed on a client device specific basis, a client device type specific basis, or a client device group specific basis.

The at least one memory 204 and the computer program code are further configured to, with the at least one processor 202, cause the radio access network controller 200 at least to perform analyzing the received mobility reports, e.g., to identify changes in mobility characteristics in the one or more service areas.

At least in some embodiments, the analyzing of the received mobility reports may comprise applying a machine learning model to the received mobility reports to identify changes in mobility characteristics in the one or more service areas.

In response to the analyzing resulting in a perceived need for an update of a cell configuration of a service area of the one or more service areas, the at least one memory 204 and the computer program code are further configured to, with the at least one processor 202, cause the radio access network controller 200 at least to perform determining updated cell configuration information for the service area of the one or more service areas, e.g., based at least on the received mobility reports.

For example, the changes in the mobility characteristics may comprise a vehicle traffic jam and/or a pedestrian rush hour. The change in mobility characteristics may further comprise a change in a cell in terms of a number of client devices, types of client devices, or groups of client devices. Client device types or client device groups may for instance have different client device capabilities in terms of mobility handling, e.g., support of different handover procedure types (such as with and without support of conditional handover or fast handover, or with and without support of multiple receivers/transmitters), or different handover measurements. Some client devices may also be in a specific state or mode, such as in a reduced measurements—mode to support energy saving. Different client devices, client device types and/or client device groups may be moving with different velocities in a cell/beam (stationary client devices, pedestrian client devices, automotive client devices, etc.) and thus may cause changes in mobility characteristics.

At least in some embodiments, the determining of the updated cell configuration information may comprise applying mobility robustness optimization or beam-based mobility robustness optimization based at least on the received mobility reports.

For example, the updated cell configuration information may comprise an updated cell individual offset (CIO), an updated beam-based cell individual offset, an updated reporting period for sending the mobility reports, an updated reporting option for sending the mobility reports, and/or an updated cell or beam specific configuration of the at least one network node device 210 in the service area of the one or more service areas. For example, the reporting option for sending the mobility reports may include reporting a long term KPI/PM counter and/or reporting an individual failure event.

The at least one memory 204 and the computer program code are further configured to, with the at least one processor 202, cause the radio access network controller 200 at least to perform transmitting the updated cell configuration information towards at least one network node device 210 in the service area of the one or more service areas. At least in some embodiments, the updated cell configuration information may be indicated (e.g., signaled) to be applied on a client device specific basis, a client device type specific basis, or a client device group specific basis.

At least in some embodiments, the receiving of the mobility reports and/or the transmitting of the updated cell configuration information may be performed via using an E2 interface and/or an E2 service model protocol (such as E2SM-RC (E2 service model for RAN control) protocol or E2SM-CC (E2 service model for cell control) protocol).

Figure 3B:
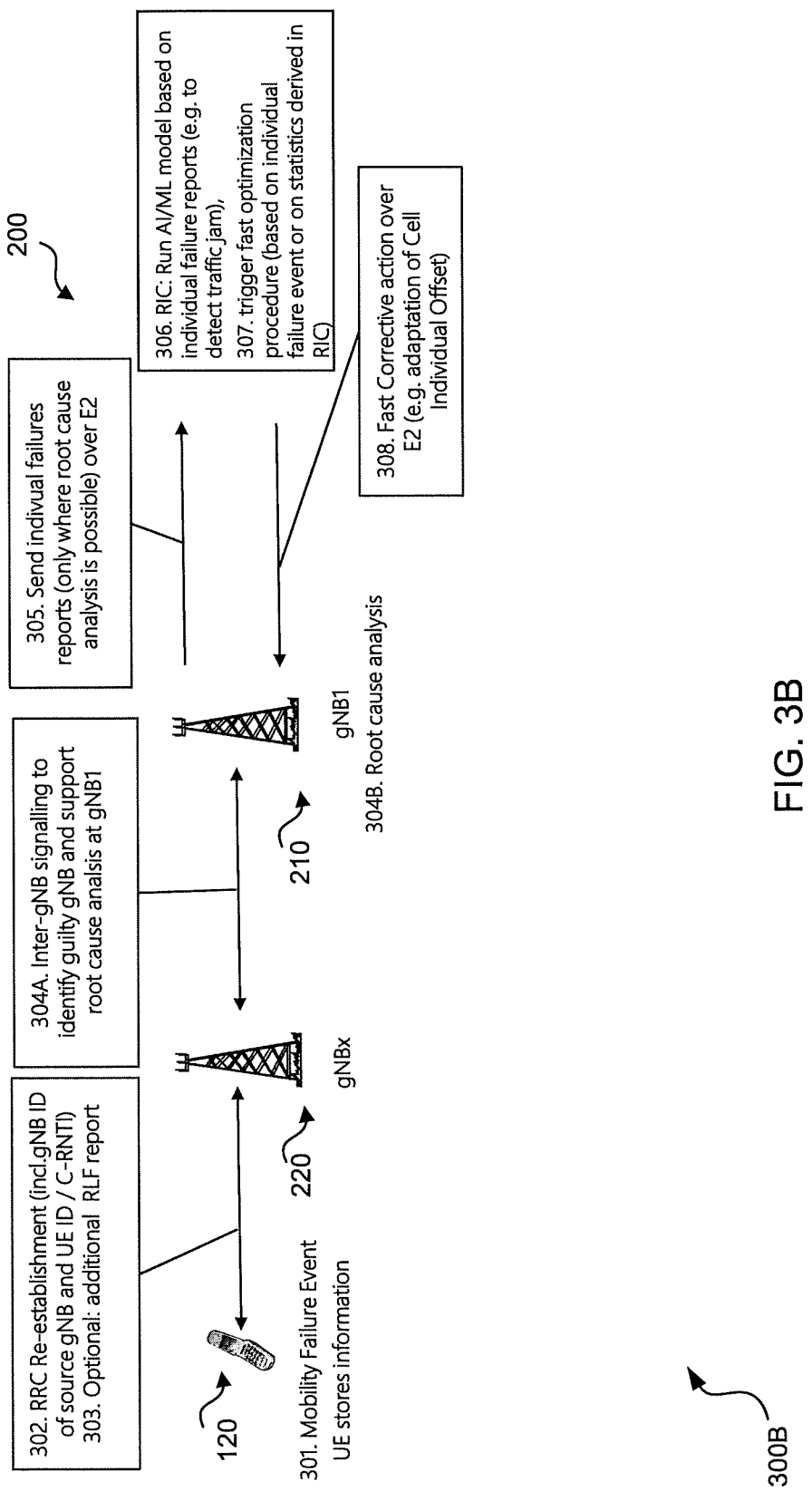
FIG. 3B shows an example embodiment of the subject matter described herein illustrating enhanced mobility reporting and fast radio access network controller based mobility optimization.

Diagram 300B of FIG. 3B illustrates an example of enhanced mobility reporting and fast radio access network controller-based mobility optimization, in accordance with an example embodiment.

During a failure event (operation 301) measurement information may be stored at the client device 120 for later reporting. Once the client device 120 is back in coverage of a suitable cell, the client device may start an RRC re-connection procedure (operation 302) in which some information may be provided to the new network node device 220 about the failure event that happened, including the cell identification (ID) the client device 120 was last connected to and a cell radio network temporary identifier (C-RNTI) the client device 120 was assigned at that time. Also, an RRC radio link failure report may optionally be provided at operation 303. The network node device 220 may fetch some future measurements from the client device 120 as stored during the event if the client device 120 was configured with the SON/(minimization of driving test (MDT) measurements. After some inter-network node device signalling (operation 304A), information may be sent to the originating network node device 210 that started the mobility procedure that failed later on.

The network node device 210 may make a root cause analysis by combining the received information with internal state information (operation 304B).

At operation 305, individual failure reports may be sent to the near-real time radio access network controller 200 over the E2 interface. Along with the failure report, additional cell specific information may be forwarded to the near-real time radio access network controller 200. The radio access network controller may receive such information from a large number of cells and run data analytics (e.g., AI/ML based) to identify changes in the mobility characteristics in a service area (operation 306). This allows the radio access network controller 200 for instance to detect or categorize traffic situations (e.g., low traffic, high traffic, traffic jam, etc.). The radio access network controller 200 may combine information from various cells since such traffic characteristics commonly span across cells. With beam-based reports as used in beam-based MRO (bMRO) even the traffic situation on individual streets may be derived or its evolution may be predicted. The disclosed failure reports and their sequence and order in time may provide more detailed information compared to the current mobility counters aggregated over a long period of time, and advanced data analytics may provide the means to process such information in detail.

Once a change in mobility characteristics is observed (e.g., a traffic jam) that may benefit from an update of the cell configuration of the service area, a start of the optimization algorithm may be triggered at operation 307. The optimization algorithm (e.g., MRO) may use as input the individual failure reports, or for simplicity of the algorithm the overall failure statistics derived from them. Once update configurations (such as cell individual offsets) for the MRO are calculated, they may be sent towards the network node devices in the service area (operation 308). There may also be other corrective configurations. For instance, if the traffic increases, the reporting period TKPI may be decreased, because more reliable statistics become available in a shorter period. Similarly, a cell or beam specific configuration of the network node device 210 may be adapted, e.g., according to pre-dominating mobility characteristics.

Figure 9:
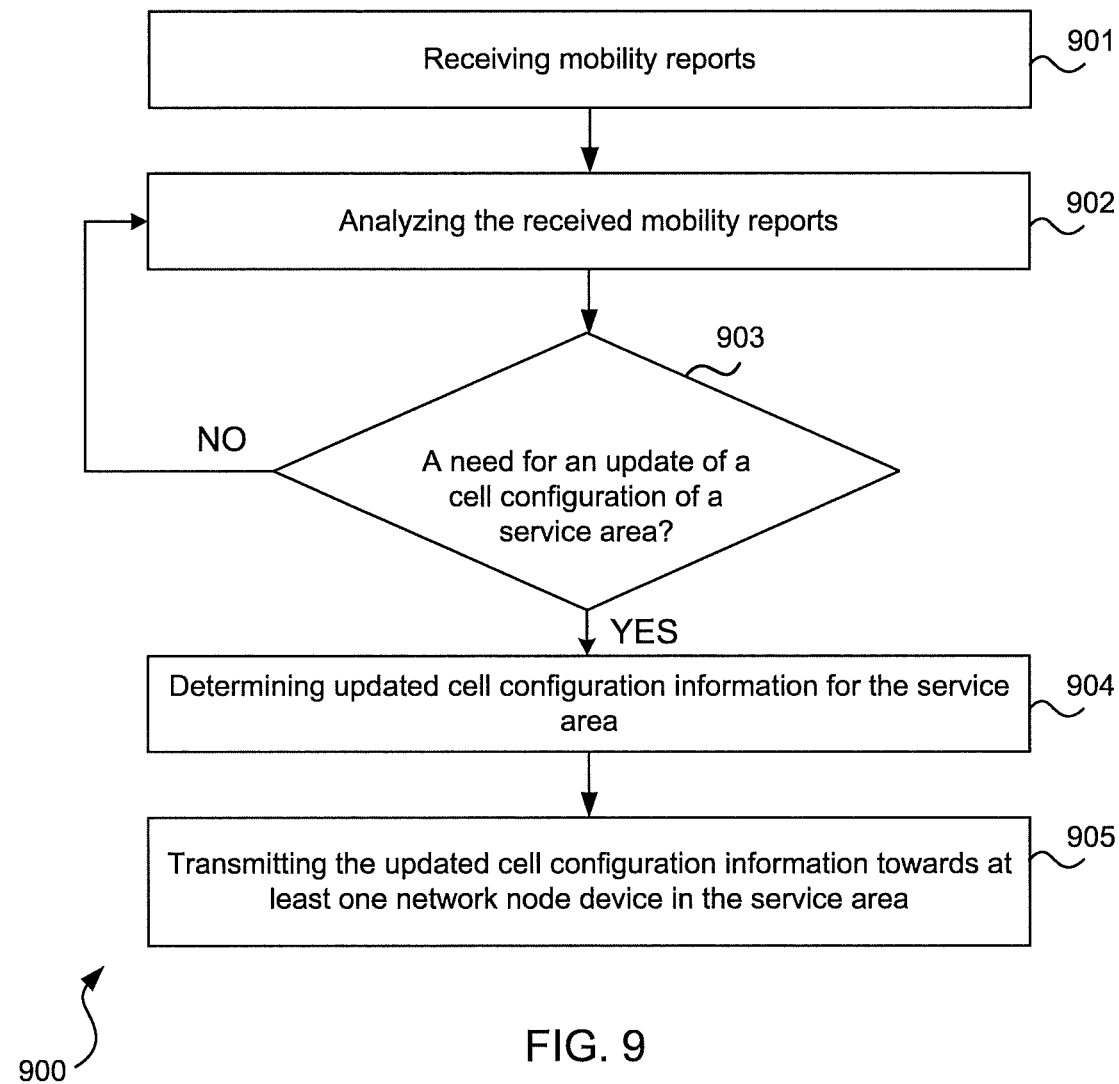
FIG. 9 shows an example embodiment of the subject matter described herein illustrating a method.

FIG. 9 illustrates an example flow chart of a method 900, in accordance with an example embodiment.

At operation 901, mobility reports are received at the radio access network controller 200 from multiple network node devices 210, 220. The mobility reports are related to client devices 120, 130 in one or more service areas of the multiple network node devices 210, 220. Each mobility report reports at least one individual failure event to complement one or more aggregated mobility event counters and/or one or more aggregated performance measurement reports.

At operation 902, the radio access network controller 200 analyzes the received mobility reports.

In response to the analyzing resulting in a perceived need at operation 903 for an update of a cell configuration of a service area of the one or more service areas, at operation 904 the radio access network controller 200 determines updated cell configuration information for the service area of the one or more service areas.

At operation 905, the updated cell configuration information is transmitted from the radio access network controller 200 towards at least one network node device 210 in the service area of the one or more service areas.

The method 900 may be performed by the radio access network controller 200 of FIG. 2A. The operations 901-905 can, for example, be performed by the at least one processor 202 and the at least one memory 204. Operation 901 may correspond with operation 305. Operation 902 may correspond with operations 306, 306A, 306B. Operations 903, 904 may correspond with operation 307. Operation 905 may correspond with operation 308, 308A, 308B. Further features of the method 900 directly result from the functionalities and parameters of the radio access network controller 200, and thus are not repeated here. The method 900 can be performed by computer program(s).

Figure 2B:
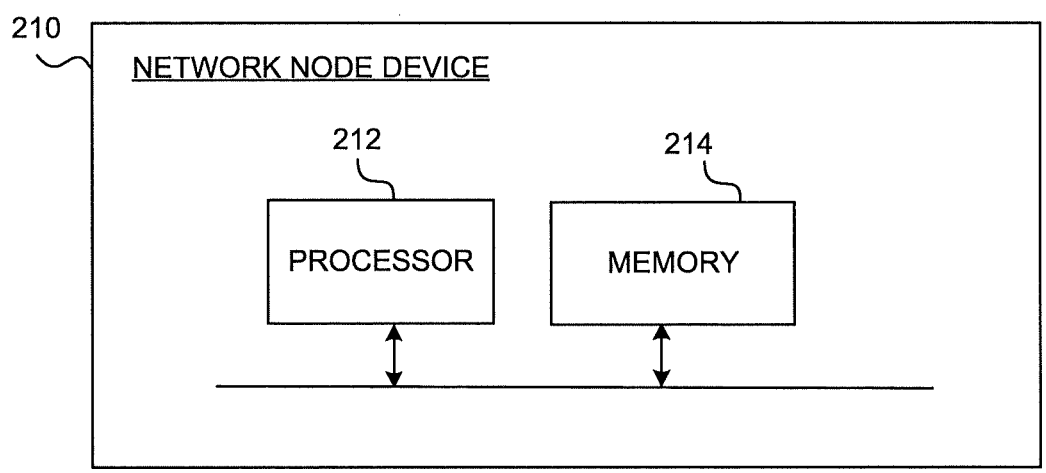
FIG. 2B shows an example embodiment of the subject matter described herein illustrating a network node device.

FIG. 2B is a block diagram of the network node device 210, in accordance with an example embodiment. The network node device 210 comprises at least one processor 212 and at least one memory 214 including computer program code. The network node device 210 may also include other elements, such as a transceiver configured to enable the network node device 210 to transmit and/or receive information to/from other devices, as well as other elements not shown in FIG. 2B. In one example, the network node device 210 may use the transceiver to transmit or receive signaling information and data in accordance with at least one cellular communication protocol. The transceiver may be configured to provide at least one wireless radio connection, such as for example a 3GPP mobile broadband connection (e.g., 5G). The transceiver may be configured to be coupled to at least one antenna to transmit and/or receive radio frequency signals.

Although the network node device 210 is depicted to include only one processor 212, the network node device 210 may include more processors. In an embodiment, the memory 214 is capable of storing instructions, such as an operating system and/or various applications. Furthermore, the memory 214 may include a storage that may be used to store, e.g., at least some of the information and data used in the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and nonvolatile memory devices. For example, the memory 214 may be embodied as semiconductor memories (such as mask ROM, PROM (programmable ROM), EPROM (erasable PROM), flash ROM, RAM (random access memory), etc.).

The network node device 210 may comprise a base station. The base station may include, e.g., a fifth-generation base station (gNB) or any such device providing an air interface for client devices to connect to the wireless network via wireless transmissions. At least in some embodiments, the network node device 210 may comprise a multiple-input and multiple-output (MIMO) capable network node device.

The at least one memory 214 and the computer program code are configured to, with the at least one processor 212, cause the network node device 210 at least to perform receiving information about an individual failure event related to one or more client devices 120, 130 while the one or more client devices 120, 130 were in a service area of the network node device 210.

The at least one memory 214 and the computer program code are further configured to, with the at least one processor 212, cause the network node device 210 at least to perform generating a mobility report based on the received information. The mobility report reports the individual failure event to complement one or more aggregated mobility event counters and/or one or more aggregated performance measurement reports.

At least in some embodiments, the generating of the mobility report may be performed in response to identifying a root cause for the individual failure event and/or in response to a mobility related criterion being fulfilled.

The at least one memory 214 and the computer program code are further configured to, with the at least one processor 212, cause the network node device 210 at least to perform transmitting the generated mobility report towards a radio access network controller 200.

Further features of the network node device 210 directly result from the functionalities and parameters of the radio access network controller 200 and thus are not repeated here.

Figure 10:
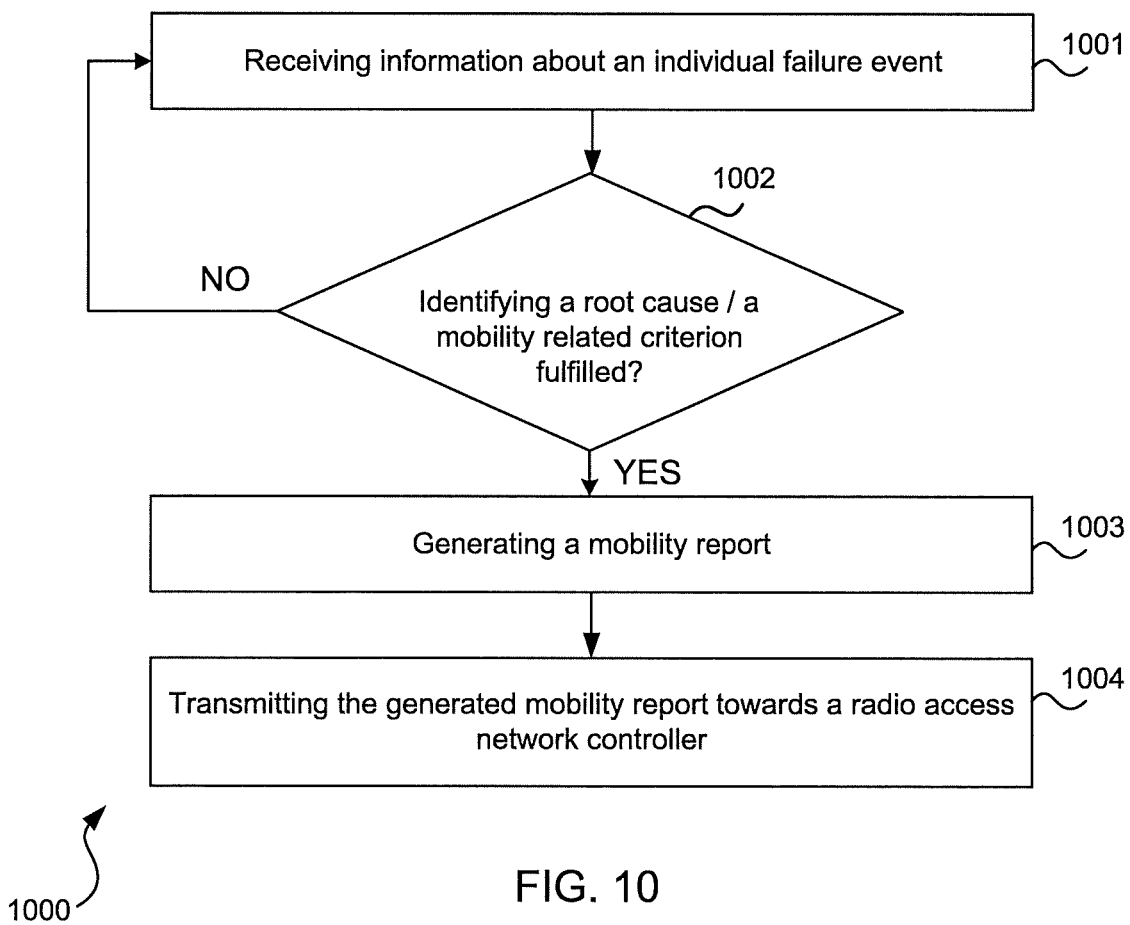
FIG. 10 shows an example embodiment of the subject matter described herein illustrating another method.

FIG. 10 illustrates an example flow chart of a method 1000, in accordance with an example embodiment.

At operation 1001, information about an individual failure event is received at the network node device 210. The information is related to one or more client devices 120, 130 while in a service area of the network node device 210.

At optional operation 1002, a root cause for the individual failure event may be identified, or a mobility related criterion may be fulfilled.

At operation 1003, the network node device 210 generates a mobility report based on the received information. The mobility report reports the individual failure event to complement one or more aggregated mobility event counters and/or one or more aggregated performance measurement reports. The generated mobility report may include at least one mobility related KPI/PM, such as the overall number of HO attempts, the number of executed handover, etc., as described in more detail above.

At operation 1004, the generated mobility report is transmitted from the network node device 210 towards the radio access network controller 200.

The method 1000 may be performed by the network node device 210 of FIG. 2B. The operations 1001-1004 can, for example, be performed by the at least one processor 212 and the at least one memory 214. Operation 1001 may correspond with operations 304, 304A. Operations 1002-1003 may correspond with operation 304B. Operation 1004 may correspond with operation 305. Further features of the method 1000 directly result from the functionalities and parameters of the network node device 210, and thus are not repeated here. The method 1000 can be performed by computer program(s).

Figure 4:
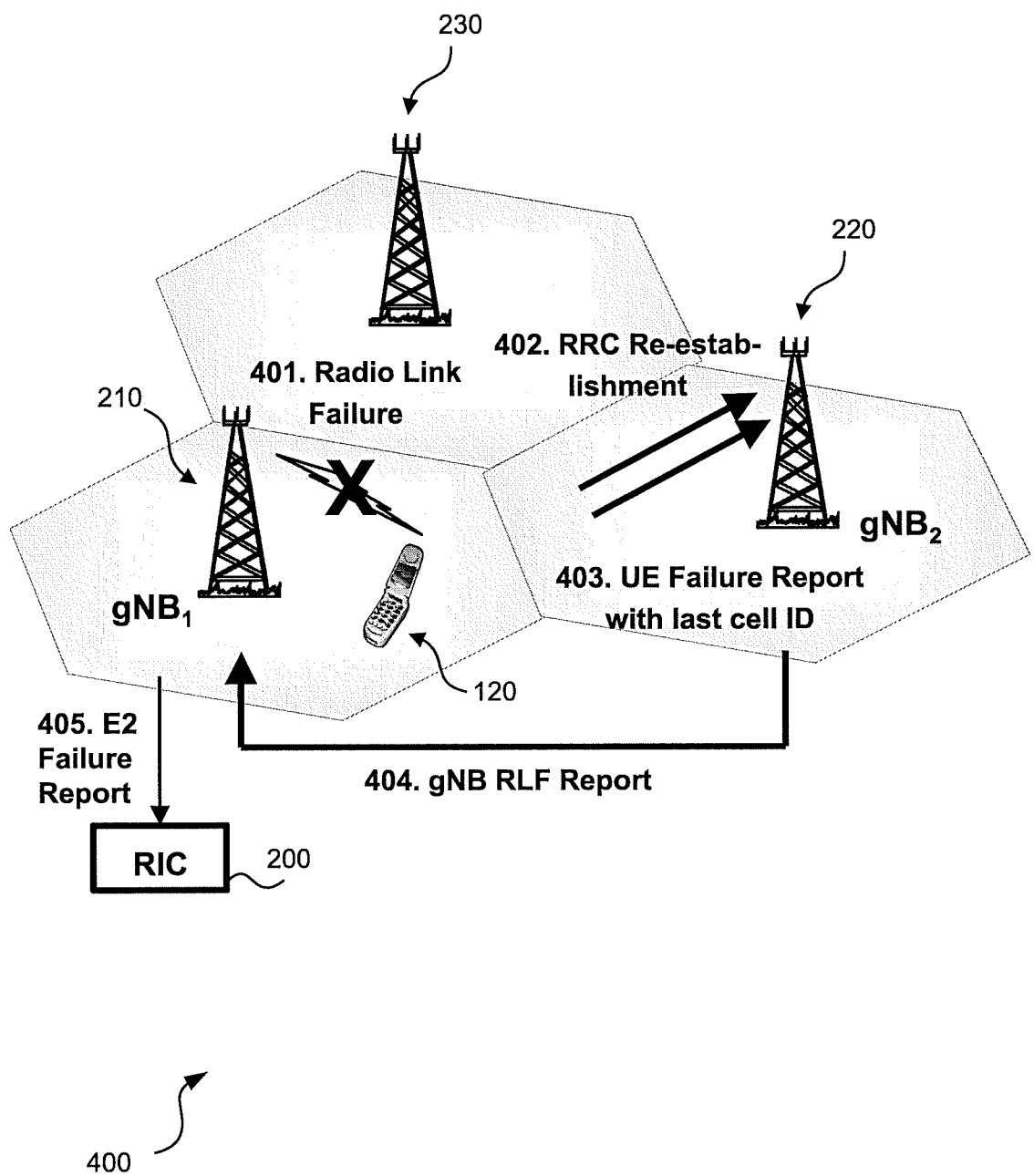
FIG. 4 shows an example embodiment of the subject matter described herein illustrating a too late handover root cause analysis and signalling failure event towards a near-real time radio access network controller.

To further describe the features and functionalities of the network node device 210, diagram 400 of FIG. 4 illustrates an example of a too late handover failure root cause analysis, in accordance with an example embodiment. The root cause analysis and the information forwarded towards the near-real time radio access network controller 200 are first elaborated for this example before moving to more complex failure cases.

There are several messages that need to be exchanged between the client devices and network node devices involved before a message towards the near-real time radio access network controller 200 may be composed and forwarded, which provides the information for a root cause analysis and for deriving mobility statistics in the near-real time radio access network controller 200.

Figure 5:
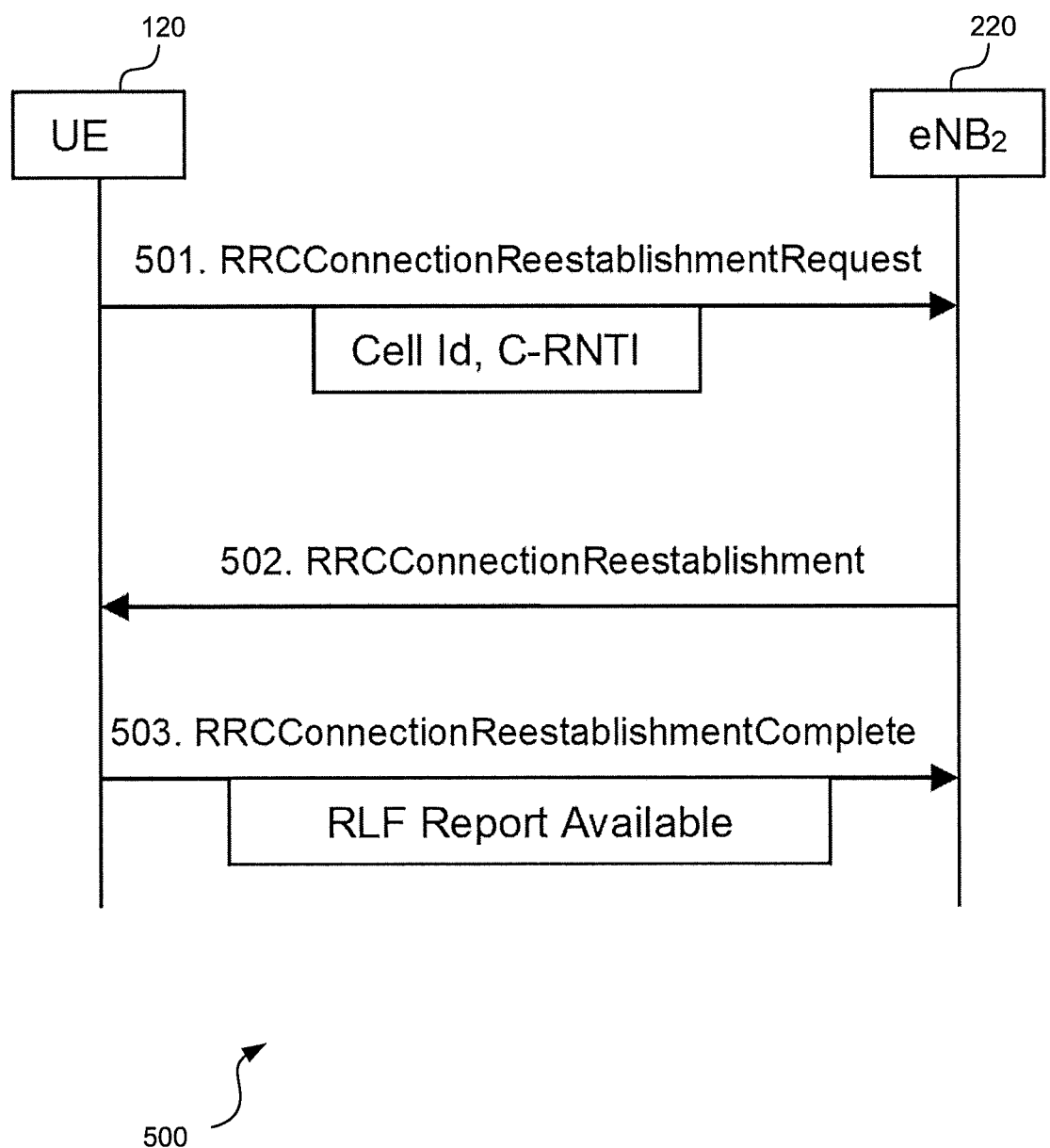
FIG. 5 shows an example embodiment of the subject matter described herein illustrating a detailed user equipment radio resource control re-establishment and radio link failure reporting procedure.

In a too late HO scenario, as shown in FIG. 4, a radio link failure may happen at operation 401 in the serving network node device 210 (also called a source network node device) in the handover procedure. Before the HO procedure is completed, the link of the client device 120 is lost. At this time, the client device 120 may store the latest report. Once back in coverage of a new cell (network node device 220 in this case), the client device 120 may make an RRC re-establishment to this new network node device 220 (operation 402). This signalling may include a cell ID (e.g., physical cell identity) of the last serving cell (network node device 210) as well as a client device ID (e.g., C-RNTI) the client device was assigned with in this cell (operation 4033). Within the re-establishment message, the client device 120 may indicate the availability of a RLF report. The network node device 220 may fetch this report to get details about the RLF. In accordance with an example embodiment, an example of the RRC connection re-establishment procedure is illustrated in diagram 500 of FIG. 5 in which an RRC connection re-establishment request (including the cell ID and the C-RNTI) may be sent by the client device 120 to the network node device 220 at operation 501. At operation 502, the network node device 220 may send an RRC connection re-establishment message to the client device 120, and at operation 503 the client device 120 may send an RRC connection re-establishment complete message (including the indication of the availability of the RLF report) to the network node device 220.

At least some of the disclosed embodiments may provide signalling towards the radio access network controller 200 to enable the radio access network controller 200 to do a root cause analysis. While the cell ID and the C-RNTI of the serving cell where the RLF happened are known to network node device 220, it may not be clear whether the RLF was caused by a mobility event, a coverage hole in the cell, or something else. In support of a failure event root cause analysis, the network node device 220 may send a network node device RLF report over an Xn interface (or an X2 interface in case of long term evolution (LTE)) to the network node device 210 (operation 404).

The RLF report or message may comprise at least some of the following information elements:
  failure cell ID: physical cell ID (PCI) where the RLF occurred,
  re-establishment cell ID: PCI of the RL re-establishment,
  C-RNTI: user ID at the moment the RLF occurred, and
  message authentication code—integrity (MAC-I): optional 16-bit integrity protection.

After the network node device 210 receives this message, based on a C-RNTI of the client device, the network node device 210 is able to know if the respective client device has been within a mobility procedure or not. For this purpose, the network node device 210 may temporarily store respective information associated with the C-RNTI. This client device context information may be stored for client devices that did not have a successful handover (i.e., HO complete message was not received by the target network node device to which the client device was handed over). If the network node device 210 has a track record of a not completed HO procedure (HO command was sent to this specific client device identified by the client devices C-RNTI, but the HO complete message was not received for this client device by the target network node device), the network node device 210 knows that this was a too late HO. The HO command was sent too late to the client device and this message was most likely not received correctly. In the current systems the respective PM/KPI failure counters would have to be incremented. For every successful event a success PM/KPI counter would be incremented.

Figure 6:
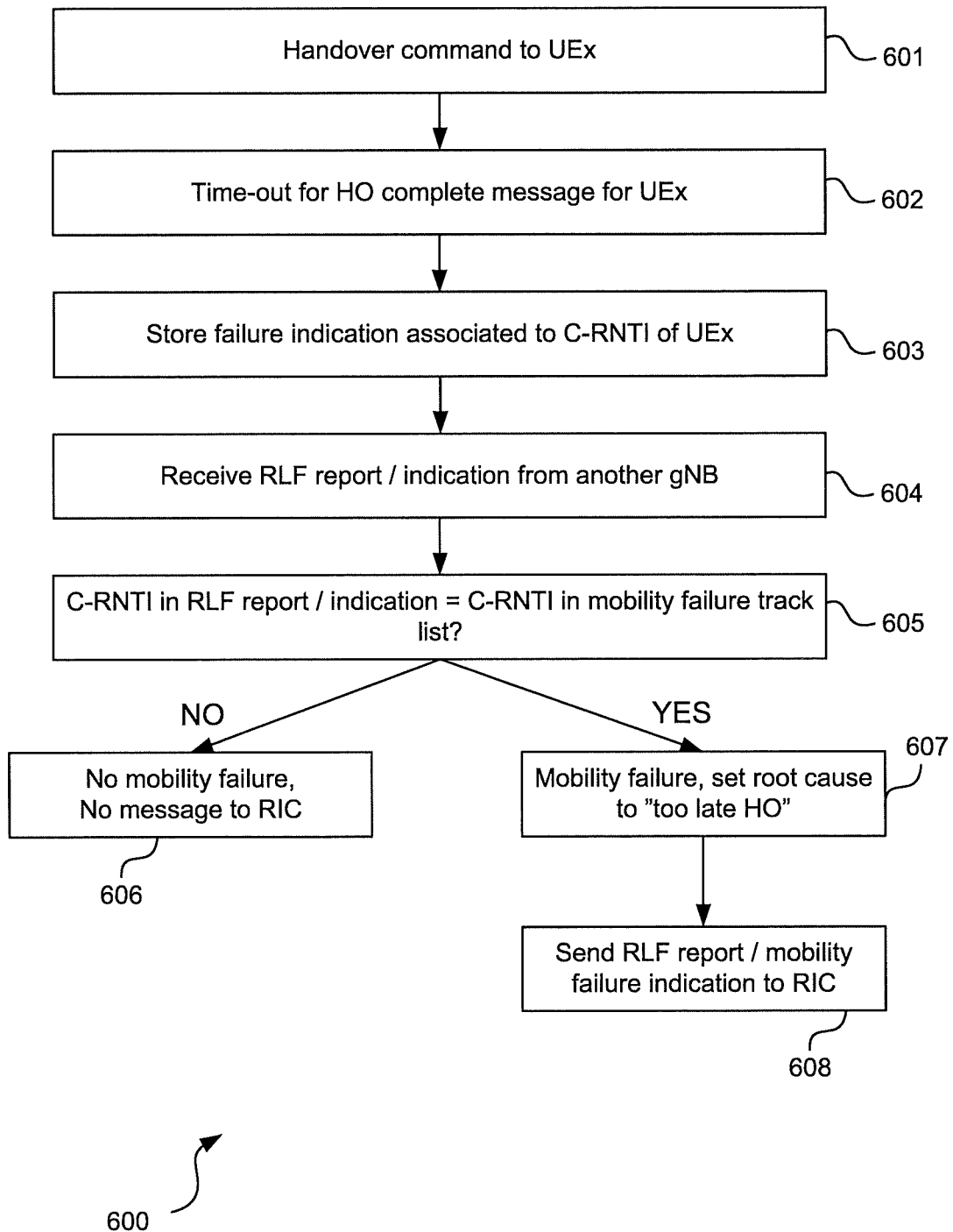
FIG. 6 shows an example embodiment of the subject matter described herein illustrating a message flow for root cause analysis and indication to a radio access network controller for a too late handover by a network node device.

In at least some of the disclosed embodiments, an additional message at operation 405 to the near-real time radio access network controller 200 may be initiated in case a failure root cause has been identified, in this case for a too late HO event. The flow chart 600 in FIG. 6 further illustrates the behavior of the network node device 210 in this respect, in accordance with an example embodiment. At operation 601, the handover procedure with the client device 120 may be started. At operation 602, a time-out occurs for a HO complete message (due to the radio link failure that happened), so the network node device 210 may store a corresponding failure indication and associate it with the C-RNTI of the client device 120 at operation 603. At operation 604, the network node device 210 may receive the RLF report or indication from the network node device 220. At operation 605, the network node device 210 may check whether a C-RNTI included in the RLF report or indication corresponds with a C-RNTI included in a failure event track list. If not, the network node device 210 may determine that no failure event has occurred and no additional message is sent to the near-real time radio access network controller 200, operation 606. If yes, the network node device 210 may determine at operation 607 that a failure event has occurred (with the root cause being the too late HO), and the mobility report may be sent to the near-real time radio access network controller 200, operation 608.

The failure event track list as stored in the network node device 220 may comprise different information about the client devices. In the too late HO example, it may be clear from the list that a HO command has been sent to a client device x with this C-RNTI while a 'HO complete'-message was not received.

In the following, a few embodiments are introduced of how the network node device 210 may forward respective information to the near-real time radio access network controller 200. In an O-RAN architecture, this message may be communicated via the E2 interface. In other architectures, it may be communicated via the X2/Xn interface to a network node device having a controlling function or hosting a central Radio resource management (RRM) function, etc. In the O-RAN case, an E2 application protocol may be used, or an E2 service model, e.g., for key performance measurement may be used.

The E2 message from the network node device 210 (or a respective O-CU—O-RAN central unit hosting the RRC protocol and level 3 (L3) mobility) to the near-real time radio access network controller 200 may comprise an E2 failure event indication or an E2 radio link failure indication or report message (or any other message) comprising a failure or root cause indication for a too late handover (or any other root cause that was uniquely identified). It may also comprise a set of instantaneous mobility PM/KPI counters. In this example, it may include the number of successful mobility events versus the number of too late HOs within a certain time. An E2 radio link failure indication or report message may also be sent by forwarding respective Xn/X2 signaling to the radio access network controller 200 (i.e., the message in operation 404 of FIG. 4) and adding some additional information elements such as the root cause (indication of a too late HO in this example). This approach may minimize the processing requirements in the network node device 210. The message is just forwarded or slightly modified. This message and the respective failure cause may support the near-real time radio access network controller 200 to generate its own instantaneous mobility statistics, i.e., the overall number of too late HOs that happened in this cell. In the case of bMRO, the information may also contain beam information or beam group information to derive respective statistics for a given beam or beam group. The message may also contain a counter of the overall successful HOs within a certain period. This may allow the radio access network controller 200 to calculate overall failure statistics/failure rates on top of the absolute number of HO failure of each category. Signalling as described above may be added to any other existing E2 message and may alternatively be used to identify any other root causes, such as too early HO, HO to wrong cell, ping-pong HO etc.

In summary, the failure message may comprise at least one of the following:
failure event with an indicated root cause, and
failure event with associated assistance information that allows the radio access network controller 200 to derive the root cause.

Furthermore, instantaneous mobility PM/KPI counters may be sent more regularly (e.g., each minute or every 100 ms instead of every 15 min) or instantly after each mobility event.

Similar procedures may involve inter-system mobility messages, e.g., between LTE and NR.

By this faster adaptation to the actual situation, the system performance may be improved for several scenarios, e.g., for areas/cells with quickly changing mobility characteristics. In the example of fast (b)MRO adaptation, it means that the number of handover failures or call drops may be reduced by the quick adaptation of the mobility parameters. Furthermore, the overall number of handovers may be reduced as well as the number of handovers to the wrong cell and the number of ping pong handovers. Respective root cause analysis for too late HO, too early HO, HO to wrong cell, and ping-pong failures may be used.

At least some of the disclosed embodiments may allow adaptively selecting between the different reporting methods on a base station-, site-, or cell-specific basis. For example, the disclosed fast loop-based reporting may be preferred for cells covering streets where a lot of mobility events take place and where traffic jams or pedestrian rush hours happen regularly. Therefore, depending on deployment options, traffic, or mobility characteristics of a certain site/cell, the network node device cell may or may not report such events instantaneously to the network. The instantaneous event-based reporting may be added on top of the aggregated reporting of the slow loop, or the network may be switched between the reporting methods. Based on certain criteria, the network may configure a network node device to enable/disable aggregated or instantaneous event-based reporting or both.

An example criterion may include the number of mobility events per minute. If there are very few events (e.g., <10 events per minute), an aggregated reporting mechanism of a long time period may provide reliable statistics. If there are many mobility events (e.g., >200 events per minute) a faster reporting may be configured for this cell. There may be different levels of faster reporting. For this purpose, the reporting time interval TKPI may be adjusted. The support of a dynamic TKPI may also be a network node device capability. In current networks, there may be a single T_KPI per network for all the cells configured. In contrast, multiple TKPI per network node device, cell or site may be supported in a network using at least some of the disclosed embodiments. While the current implementation adaptation time interval may be 24 h (using 96 PM/KPI counter reports each taking 15 min), the faster adaptation time interval may be in the range of minutes (using faster reporting periods of 100 ms to 1 min). While the current (b)MRO algorithm may be handled at the OAM/SMO/Non-RT radio access network controller level, the disclosed fast (b)MRO algorithms may be handled at the near-real time radio access network controller 200 part of the radio access network close to the network node devices. In the current case, PM/KPI counters may be reported via an O1 interface to the SMO 140, while in at least some of the disclosed embodiments statistics or failure events may be reported via the E2 interface to the near-real time radio access network controller 200. In the current case, cell individual offsets may be communicated from the SMO 140 (non-real time radio access network controller) to a network node device via the O1 interface, while in at least some of the disclosed embodiments with the faster loop the CIOs may be communicated from the near-real time radio access network controller 20 to a network node device via the E2 interface.

Part of the measurement reporting configuration of a network node device, as configured via E2 by the near-real time radio access network controller 200, may be to send updated mobility statistics not (only) on a pre-defined reporting period TKPI, but on a pre-defined number of mobility events X EVENT. The radio access network controller 200 may for instance ask for updated mobility events every, e.g., 50, 100, 200 or 400 mobility events. Based on the reporting period, the radio access network controller 200 may get to know how many mobility events took place. In case of increased traffic, the number of mobility events may grow. In case of sudden degradation of mobility events, a traffic jam may be the underlying reason. The relevant data may be analyzed by AI/ML algorithms that may be able to identify different situations reliably or may be able to detect mobility patterns that are repeated over time.

Also, a change in the number of mobility events per time period (e.g., when a traffic jam starts or is resolved) may be indicated by a change of mobility characteristics, which may trigger an instantaneous report of the mobility statistics instead of further aggregation. While the optimization algorithm in the SMO/non-RT radio access network controller may run with slow periodicity (e.g., on daily basis), the optimization algorithm hosted in the near-real time radio access network controller 200 may be triggered whenever statistics become available.

After monitoring the performance of the algorithms, the fast adaptation loop and fast instantaneous event based signaling may be enabled/disabled dynamically.

Figure 7:
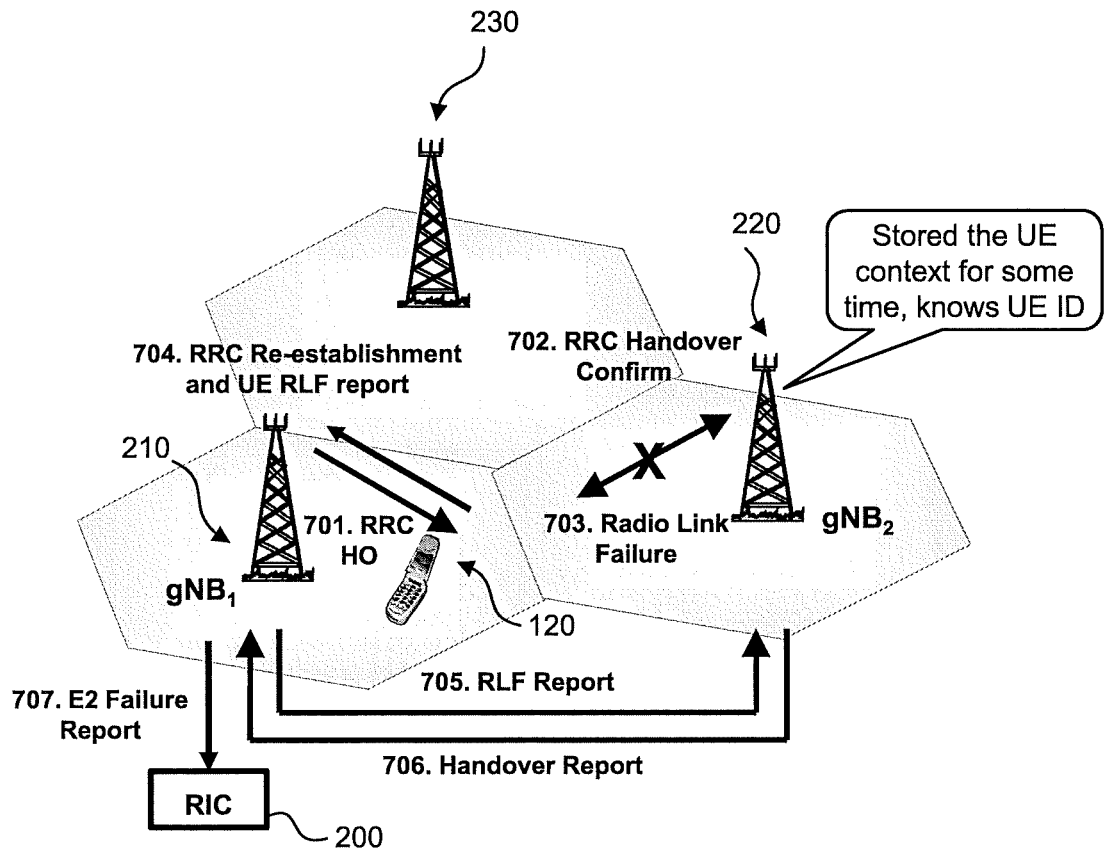
FIG. 7 shows an example embodiment of the subject matter described herein illustrating a too early handover root cause analysis and signalling failure event towards a near-real time radio access network controller.
Figure 8:
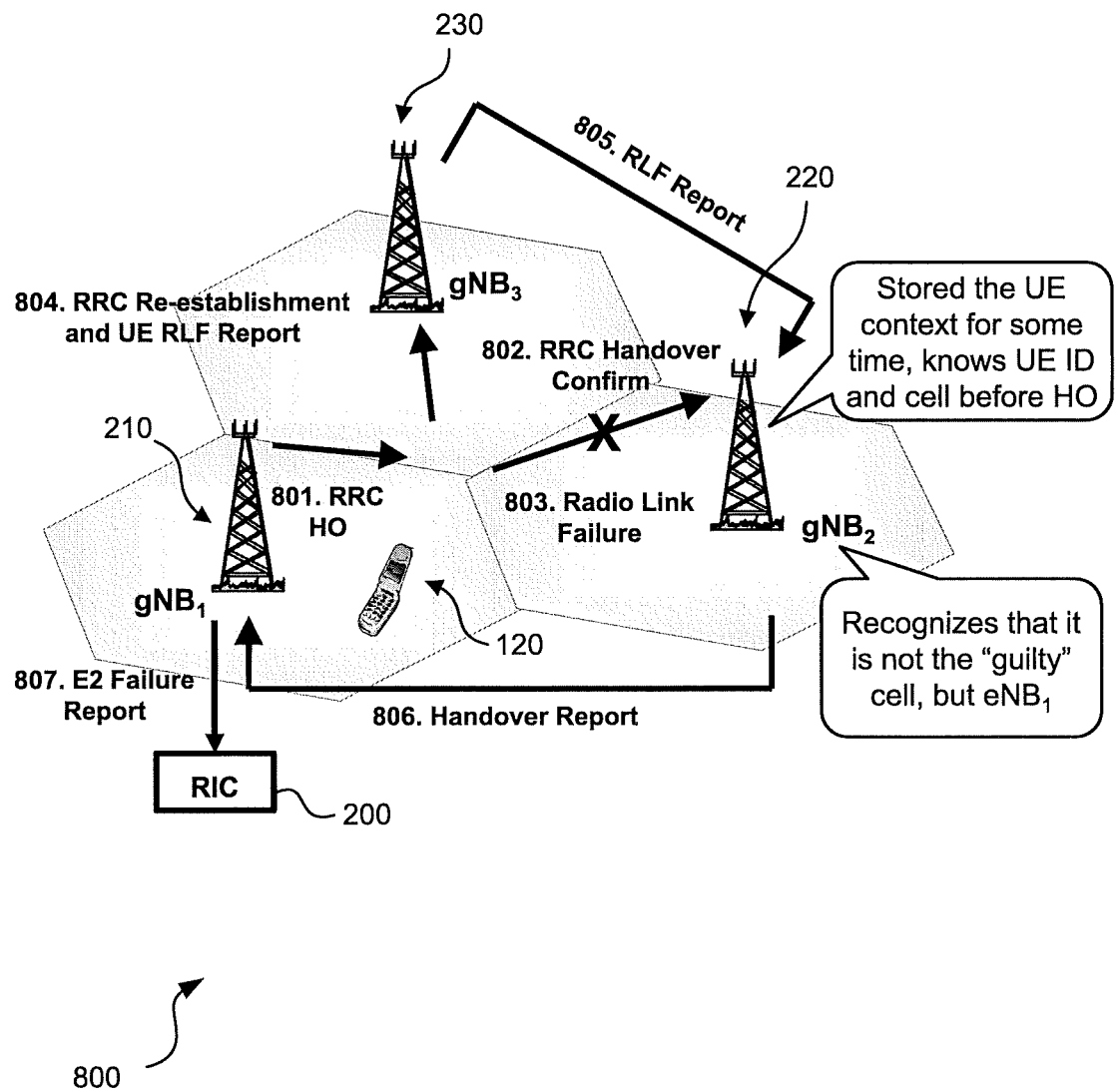
FIG. 8 shows an example embodiment of the subject matter described herein illustrating handover to wrong cell root cause analysis and signalling failure event towards a near-real time radio access network controller.

The above-described mechanisms may be applied, e.g., to mitigate too early handovers as illustrated in accordance with an example embodiment in diagram 700 of FIG. 7, and handovers to wrong cell as illustrated in accordance with an example embodiment in diagram 800 of FIG. 8. For the too early handovers, the E2 failure indication or reporting of mobility statistics to the near-real time radio access network controller 200 may be generated, e.g., as follows. The client device 120 may receive an RRC HO command by the network node device 210 too early (operation 701). It tries to connect to the target network node device 220 and may already exchange some messages (operation 702). For instance, a random access channel (RACH) procedure may be successful. Nevertheless, at some point in time, there will be a radio link failure (operation 703) causing the client device 120 to do an RRC re-establishment to the source network node device 210 (operation 704). While the network node device 210 could already send a failure indication to the near-real time radio access network controller 200 at this point in time, it is not possible for the near-real time radio access network controller 200 to identify the root cause. The network node device 210 may not even know that this client device 120 was the client device to which it was sending the RRC handover command in operation 701. Therefore, the network node device 210 requests for this specific client device (the last C-RNTI of the client device 120 used by network node device 220 was part of the RRC re-establishment message) from the network node device 220 (the cell identity of the network node device 220 was also again part of the RRC re-establishment message) to send back a radio link failure report/failure indication (operation 705) which may include information elements from the radio link failure report of the client device 120 after the RRC re-establishment. The network node device 220 has stored some context information of the lost client device associated to the respective client device C-RNTI, and may thus respond with the handover report (operation 706). This may include mobility related information as well as the C-RNTI of the client device 120 that was used by the network node device 210 when sending the RRC handover command in operation 701. The network node device 210 may do the failure root cause analysis and send the updated mobility statistics to the near-real time radio access network controller 200 as part of the E2 message, or it may forward the X2/Xn handover report message to the near-real time radio access network controller 200 (operation 707) with or without additional assistance information. The near-real time radio access network controller 200, based on the information received in operation 707, may process the updated mobility statistics, or, based on the handover report from operation 706 with the added assistance information from the network node device 210, it may do the failure root cause analysis and update the mobility statistics itself. Depending on the statistics and the analysis of the available information, the radio access network controller 200 may trigger an updated MRO optimization procedure and/or it may reconfigure the TKPI reporting period of the network node device 210.

For handovers to wrong cell, the E2 failure indication or reporting of mobility statistics to the near-real time radio access network controller 200 may be generated, e.g., as follows. The client device 120 may receive an RRC HO command from the network node device 210 to handover to the network node device 220 (operation 801). Nevertheless, the HO eventually is not successful (operation 803) and the client device 120 does an RRC re-establishment to another network node device 230. Once again, no failure indication is sent to the radio access network controller 200 as this point in time. The RRC re-establishment and client device 120 RLF report of operation 804 does include the network node device identity of the network node device 220 since the client device 120 tried to connect to this cell in operation 802. Based on the stored client device 120 context information associated to the C-RNTI in the network node device 220 when the failure happened, the network node device 220 knows the client device 120 was handed over from the network node device 210 just before the failure happened. Therefore, a handover report may be sent to the network node device 210 via the Xn/X2 interface in operation 806 informing the network node device 210 about this. The network node device 210 may infer from the handover report in operation 806 the root cause and send an E2 failure report or just forward the handover report from operation 806 with some assistance information.

The radio access network controller 200 may comprise means for performing at least one method described herein. In an example, the means may comprise the at least one processor 202, and the at least one memory 204 including program code configured to, when executed by the at least one processor 202, cause the radio access network controller 200 to perform the method.

The network node device 210 may comprise means for performing at least one method described herein. In an example, the means may comprise the at least one processor 212, and the at least one memory 214 including program code configured to, when executed by the at least one processor 212, cause the network node device 210 to perform the method.

The functionality described herein can be performed, at least in part, by one or more computer program product components such as software components. According to an embodiment, the radio access network controller 200 and/or the network node device 210 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A radio access network controller, comprising:
   at least one processor; and
   at least one non-transitory memory storing instructions that, when executed with the at least one processor, cause the radio access network controller at least to perform:
   receiving, from multiple network node devices, mobility reports related to client devices in one or more service areas of the multiple network node devices, the mobility report reporting at least one individual failure event to complement at least one of: one or more aggregated mobility event counters or one or more aggregated performance measurement reports;
   wherein the multiple network node devices from which the mobility reports are received comprise base stations;
   analyzing the mobility reports received from the base stations;
   in response to the analyzing resulting in a perceived need for an update of a cell configuration of a service area of the one or more service areas, determining updated cell configuration information for said service area of the one or more service areas; and
   transmitting the updated cell configuration information towards at least one network node device in said service area of the one or more service areas.

2. The radio access network controller according to claim 1, wherein the instructions, when executed with the at least one processor, cause the radio access network controller to perform applying a machine learning model to the received mobility reports to identify changes in mobility characteristics in the one or more service areas.

3. The radio access network controller according to claim 2, wherein the changes in the mobility characteristics comprise at least one of a vehicle traffic jam, a pedestrian rush hour, or a change in a cell in terms of a number of client devices, types of client devices, or groups of client devices.

4. The radio access network controller according to claim 1, wherein the instructions, when executed with the at least one processor, cause the radio access network controller to perform applying mobility robustness optimization or beam-based mobility robustness optimization based at least on the received mobility reports.

5. The radio access network controller according to claim 1, wherein the received mobility reports comprise information about an individual failure event with an indicated root cause, or information about an individual failure event with associated assistance information to allow the instructions, when executed with the at least one processor, to cause the radio access network controller to derive a root cause.

6. The radio access network controller according to claim 5, wherein the received mobility reports further comprise at least one of: a number of too early handovers, a number of too late handovers, a number of handovers to wrong cell, a number of ping-pong handovers, a number of requested legacy handover executions, a number of successful handover executions, or a number of failed handover executions.

7. The radio access network controller according to claim 1, wherein a failure event comprises at least one of a too late handover failure, a too early handover failure, a handover to wrong cell failure, or a ping-pong handover.

8. The radio access network controller according to claim 1, wherein the updated cell configuration information transmitted to a base station comprises at least one of an updated cell individual offset, an updated beam-based cell individual offset, an updated reporting period for sending the mobility reports, an updated reporting option for sending the mobility reports, or an updated cell or beam specific configuration of the at least one network node device in said service area of the one or more service areas.

9. The radio access network controller according to claim 1, wherein the updated cell configuration information is indicated to be applied on a client device specific basis, a client device type specific basis, or a client device group specific basis.

10. The radio access network controller according to claim 1, wherein the instructions, when executed with the at least one processor, cause the radio access network controller to perform the receiving of the mobility reports on a client device specific basis, a client device type specific basis, or a client device group specific basis.

11. The radio access network controller according to claim 1, wherein the instructions, when executed with the at least one processor, cause the radio access network controller to perform at least one of the receiving of the mobility reports or the transmitting of the updated cell configuration information using at least one of an interface or a service model protocol.

12. The radio access network controller according to claim 1, wherein the radio access network controller comprises a near-real time radio access network controller.

13. The radio access network controller of claim 1, wherein the at least one network node device towards which the updated cell configuration information is transmitted comprises a base station.

14. A method, comprising:
receiving, at a radio access network controller from multiple network node devices, mobility reports related to client devices in one or more service areas of the multiple network node devices, the mobility reports reporting at least one individual failure event to complement at least one of: one or more aggregated mobility event counters or one or more aggregated performance measurement reports;
wherein the multiple network node devices from which the mobility reports are received comprise base stations;
analyzing, with the radio access network controller, the mobility reports received from the base stations;
in response to the analyzing resulting in a perceived need for an update of a cell configuration of a service area of the one or more service areas, determining, with the radio access network controller, updated cell configuration information for said service area of the one or more service areas; and
transmitting the updated cell configuration information from the radio access network controller towards at least one network node device in said service area of the one or more service areas.

15. A non-transitory program storage device readable with an apparatus, tangibly embodying a program of instructions executable with the apparatus for causing a radio access network controller to perform at least the following:
receiving, from multiple network node devices, mobility reports related to client devices in one or more service areas of the multiple network node devices, the mobility reports reporting at least one individual failure event to complement at least one of: one or more aggregated mobility event counters or one or more aggregated performance measurement reports;
wherein the multiple network node devices from which the mobility reports are received comprise base stations;
analyzing the mobility reports received from the base stations;
in response to the analyzing resulting in a perceived need for an update of a cell configuration of a service area of the one or more service areas, determining updated cell configuration information for said service area of the one or more service areas; and
transmitting the updated cell configuration information towards at least one network node device in said service area of the one or more service areas.

16. A network node device, comprising:
at least one processor; and
at least one non-transitory memory storing instructions that, when executed with the at least one processor, cause the network node device at least to perform:
receiving information about an individual failure event related to one or more client devices while in a service area of the network node device;
generating a mobility report based on the received information, the mobility report reporting the individual failure event to complement at least one of: one or more aggregated mobility event counters or one or more aggregated performance measurement reports; and
transmitting, from a base station, the generated mobility report towards a radio access network controller, wherein the network node device comprises the base station.

17. The network node device according to claim 16, wherein the instructions, when executed with the at least one processor, cause the network node device to perform the generating of the mobility report in response to at least one of: identifying a root cause for the individual failure event or a mobility related criterion being fulfilled.

18. The network node device of claim 16, wherein the instructions, when executed by the at least one processor, cause the network node device at least to perform:
receiving, with the base station from the a radio access network controller, updated cell configuration information for the service area of the network node device.

19. The network node device of claim 18, wherein the updated cell configuration information received with the base station comprises at least one of an updated cell individual offset, an updated beam-based cell individual offset, an updated reporting period for sending the mobility reports, an updated reporting option for sending the mobility reports, or an updated cell or beam specific configuration of the network node device.

20. A method, comprising:
- receiving, at a network node device, information about an individual failure event related to one or more client devices while in a service area of the network node device;
- generating, with the network node device, a mobility report based on the received information, the mobility report reporting the individual failure event to complement at least one of: one or more aggregated mobility event counters or one or more aggregated performance measurement reports; and
- transmitting, from a base station, the generated mobility report from the network node device towards a radio access network controller, wherein the network node device comprises the base station.

21. A non-transitory program storage device readable with an apparatus, tangibly embodying a program of instructions executable with the apparatus to perform at least the following:
- receiving information about an individual failure event related to one or more client devices while in a service area of the network node device;
- generating a mobility report based on the received information, the mobility report reporting the individual failure event to complement at least one of: one or more aggregated mobility event counters or one or more aggregated performance measurement reports; and
- transmitting, from a base station, the generated mobility report towards a radio access network controller, wherein the apparatus comprises the base station.

* * * * *